(12) United States Patent
Johnson et al.

(10) Patent No.: US 7,050,215 B1
(45) Date of Patent: May 23, 2006

(54) METHOD AND APPARATUS FOR PROVIDING A GAS CORRELATION FILTER FOR REMOTE SENSING OF ATMOSPHERIC TRACE GASES

(75) Inventors: Brian R. Johnson, Superior, CO (US); Thomas Ulrich Kampe, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 10/634,103

(22) Filed: Aug. 1, 2003

(51) Int. Cl.
*G02F 1/03* (2006.01)
*G02F 1/07* (2006.01)

(52) U.S. Cl. .................. 359/260; 359/261; 359/586; 359/589

(58) Field of Classification Search .............. 359/260, 359/261, 588, 589, 587, 586, 584
See application file for complete search history.

(56) References Cited

U.S. PATENT DOCUMENTS

| | | | |
|---|---|---|---|
| 3,432,239 A | 3/1969 | Holland | 356/112 |
| 3,501,641 A | 3/1970 | Krause | 250/209 |
| 3,802,777 A | 4/1974 | Regnler et al. | 356/75 |
| 3,824,018 A | 7/1974 | Crane, Jr. | 356/112 |
| 3,939,348 A | 2/1976 | Barrett | 250/339 |
| 3,998,552 A | 12/1976 | Stewart et al. | 356/103 |
| 4,035,643 A | 7/1977 | Barrett | 250/339 |
| 4,057,319 A | 11/1977 | Ash et al. | 350/96 C |
| 4,195,931 A | 4/1980 | Hara | 356/346 |
| 4,377,324 A | 3/1983 | Durand et al. | 350/166 |
| 4,400,058 A | 8/1983 | Durand et al. | 350/166 |
| 4,509,857 A | 4/1985 | Vermande | 356/346 |
| 4,553,816 A | 11/1985 | Durand et al. | 350/166 |
| 4,583,855 A | 4/1986 | Bareket | 356/351 |
| 4,615,033 A * | 9/1986 | Nakano et al. | 372/99 |
| 4,729,658 A | 3/1988 | Poultney | 356/328 |
| 4,743,114 A | 5/1988 | Crane, Jr. | 356/346 |
| 4,930,131 A | 5/1990 | Sizer, II | 372/18 |
| 4,937,447 A | 6/1990 | Barrett | 250/339 |
| 4,962,319 A | 10/1990 | Leonard et al. | 250/574 |
| 4,973,853 A | 11/1990 | Leonard et al. | 250/574 |

(Continued)

OTHER PUBLICATIONS

William S. Heaps et al., "Fabry-Perot Interferometer for col. $CO_2$," NASA Goddard Space Flight Center, 6 pages (Jun. 2002).

(Continued)

*Primary Examiner*—Ricky L. Mack
*Assistant Examiner*—Brandi Thomas
(74) *Attorney, Agent, or Firm*—Sheridan Ross P.C.

(57) ABSTRACT

A correlation filter is provided having passbands at wavelengths corresponding to the absorption spectrum of an atmospheric gas of interest. In particular, the correlation filter features narrow, non-linearly spaced passbands having center wavelengths that are correlated to the non-linearly spaced absorption lines of an atmospheric gas. A correlation filter in accordance with an embodiment of the present invention includes a compensation stack having a number of thin film layers, at least some of which have an optical thickness that is not equal to an integer multiple of one-quarter of a wavelength of an absorption line of the gas of interest. The correlation filter may be provided in association with an etalon, or may comprise a number of optical cavities. In accordance with an embodiment of the present invention, a number of absorption lines associated with an atmospheric gas may be simultaneously viewed, providing a signal indicating the presence and quantity of such gas in the atmosphere having a high signal-to-noise ratio.

36 Claims, 16 Drawing Sheets

U.S. PATENT DOCUMENTS

| | | | |
|---|---|---|---|
| 5,088,815 A | 2/1992 | Garnier et al. | 356/28.5 |
| 5,144,498 A | 9/1992 | Vincent | 359/885 |
| 5,159,406 A | 10/1992 | Adler et al. | 356/349 |
| 5,208,654 A | 5/1993 | Shao et al. | 356/358 |
| 5,212,585 A | 5/1993 | Ning | 359/276 |
| 5,214,484 A | 5/1993 | de Mollerat du Jeu | 356/28.5 |
| 5,218,426 A | 6/1993 | Hall et al. | 356/361 |
| 5,339,155 A | 8/1994 | Partridge et al. | 356/419 |
| 5,539,517 A | 7/1996 | Cabib et al. | 356/346 |
| 5,539,518 A | 7/1996 | Bennett | 356/346 |
| RE35,355 E | 10/1996 | Ryan et al. | 250/343 |
| 5,606,419 A | 2/1997 | Foosnaes et al. | 356/419 |
| 5,666,225 A | 9/1997 | Colbourne | |
| 5,719,989 A | 2/1998 | Cushing | 359/589 |
| 5,731,889 A | 3/1998 | Jeong et al. | 359/258 |
| 5,801,831 A | 9/1998 | Sargoytchev | |
| 5,835,214 A | 11/1998 | Cabib et al. | 356/346 |
| 5,999,322 A | 12/1999 | Cushing | 359/589 |
| 6,046,854 A | 4/2000 | Bhagavatula | 359/577 |
| 6,075,597 A | 6/2000 | Olshausen | 356/345 |
| 6,118,421 A | 9/2000 | Kawaguchi et al. | 345/89 |
| 6,163,380 A | 12/2000 | Hays | 356/519 |
| 6,243,170 B1 | 6/2001 | Ershov | |
| 6,268,944 B1 | 7/2001 | Szapiel | 359/159 |
| 6,504,971 B1 | 1/2003 | Margalit et al. | 385/24 |
| 6,522,469 B1 | 2/2003 | Fuqua et al. | 359/578 |
| 6,545,739 B1 | 4/2003 | Matsumoto et al. | 349/198 |
| 2002/0191268 A1* | 12/2002 | Seeser et al. | 359/260 |
| 2003/0011760 A1 | 1/2003 | Vaez-Iravani et al. | |
| 2003/0048985 A1* | 3/2003 | Hulse | 385/27 |

OTHER PUBLICATIONS

E. Serabyn et al., "Dual Fabry-Perot Filter for Measurement of CO Rotational Spectra: Design and Application to the CO Spectrum of Venus," *Applied Optics*, vol. 39, No. 34 (Dec. 1, 2000), pp. 6448-6452.

Jerzy Closek, "Narrow-Band Interference Filters with Unconventional Spacer Layers," *Applied Optics*, vol. 39, No. 1 (Jan. 1, 2000), pp. 135-140.

P.L. Land et al., "High-Transmission Comblike Optical Filters," *J. Opt. Soc. Am. A*, vol. 12, No. 3 (Mar. 1995), pp. 611-622.

* cited by examiner

METHOD AND APPARATUS FOR PROVIDING A GAS CORRELATION FILTER FOR REMOTE SENSING OF ATMOSPHERIC TRACE GASES

CROSS REFERENCES TO RELATED APPLICATIONS

The present disclosure is related to U.S. patent application Ser. No. 10/633,468, filed Aug. 1, 2003, entitled "Field Condensing Imaging System for Remote Sensing of Atmospheric Trace Gases", the entire disclosure of which is incorporated by reference herein in its entirety.

FIELD OF THE INVENTION

The present invention relates to filtering light in connection with sensing atmospheric trace gases. In particular, the present invention is directed to a filter having a number of pass bands that are closely aligned with spectral lines associated with an atmospheric trace gas of interest.

BACKGROUND OF THE INVENTION

The remote sensing of atmospheric trace gases is of great importance. In particular, obtaining accurate measurements of atmospheric trace gas species, such as CO and $CO_2$, from an aircraft or spacecraft platform is essential for improving the scientific understanding of global atmospheric chemistry, climate impacts, and the atmospheric component of the global carbon budget.

One way of obtaining information regarding the amount of atmospheric trace gases is to sense the spectral absorption of reflected sunlight. In particular, the amount of absorption of light at wavelengths corresponding to the spectral lines of the gas of interest can be detected and measured. In general, the higher the absorption of light at such wavelengths, the higher the concentration of the associated gas in the portion of the atmosphere from which the sampled light was collected. Similarly, the absorption of thermal emissions by atmospheric trace gases can be measured to obtain information regarding the amount of such gases.

Various spectrometers have been developed for enabling such measurements. For example, Fourier transform spectrometers have been developed that are capable of high spectral resolution. However, such instruments are relatively large and complex. Other instruments for sensing light within a narrow range of wavelengths include devices utilizing optical cavities, such as Fabry-Perot interferometers and multiple cavity filters formed from thin films. Although optical cavity-based instruments are capable of providing high filter resolution and can be precisely tuned to have a selected passband, they are limited in the number of spectral lines that can be simultaneously detected. This is because such filters have featured regularly spaced pass bands. In particular, the passbands of conventional cavity-based filters are centered at wavelengths that are equal to integer multiples of one-quarter the wavelength corresponding to the cavity's effective depth or optical thickness. However, spectral lines associated with atmospheric trace gases are not periodically spaced. Specifically, the quantum mechanical rules that determine the permitted energies for the absorption and emission of light result in spectral lines that are not equally spaced in energy or wavelength. Accordingly, optical cavity type instruments have only been capable of detecting a small number of spectral lines (for example 2 or 3) before the pass bands of the filter are no longer sufficiently correlated with the spectral lines of the gas of interest. Therefore, the sensitivity and signal to noise ratio of such devices has been limited.

One approach to providing a filter having characteristics precisely correlated to the gas being sensed is to provide a cell containing a sample of the gas of interest. By comparing the difference between the light passed through the gas-containing cell to a detector, and light received at a detector that has not been passed through the cell, information regarding the presence of that gas in the atmosphere can be obtained. Although systems using samples of the gas being sensed are capable of providing filter characteristics that are correlated to the gas being sensed, they are difficult to implement.

SUMMARY OF THE INVENTION

The present invention is directed to solving these and other problems and disadvantages of the prior art. According to the present invention, a gas correlation filter is provided having narrowly defined passbands that are closely correlated to the spectral lines of absorption associated with a gas of interest. In particular, in accordance with an embodiment of the present invention, a correlation filter having pass bands that are non-periodic in their spacing from one another is provided. In accordance with another embodiment of the present invention, six or more passbands of the correlation filter are precisely aligned with spectral lines of absorption of an atmospheric trace gas.

A correlation filter in accordance with an embodiment of the present invention includes an optical cavity defined by first and second reflecting surfaces. The optical cavity may have an optical depth or thickness that is greater than two wavelengths of light having a wavelength within a passband of the correlation filter. The first and second reflecting surfaces may be formed from multi-layer, thin film stacks. At least one of the reflecting surfaces comprises thin films having optical thicknesses that are not equal to an integer multiple of one-quarter of a wavelength within a passband of the correlation filter. By providing non-quarter wave thickness layers, the spacing between passbands of the filter can be precisely correlated to the wavelengths at which light is absorbed by an atmospheric gas.

In accordance with another embodiment of the present invention, a correlation filter includes multiple optical cavities. The multiple optical cavities may comprise layers within a thin-film stack having an optical thickness that is about equal to one-half the wavelength of a passband of the filter. In addition, the correlation filter includes films having an optical thickness that is not equal to an integer multiple of one-quarter of a wavelength of a passband of the filter. The inclusion of non-quarter-wave thickness layers allows the spacing between passbands of the filter to be non-periodic and non-linear, thereby allowing the passbands to be closely correlated to the absorption spectrum of an atmospheric gas being measured.

A correlation filter in accordance with the present invention may be combined with a lens for providing collimated light to the filter, and a detector for measuring the intensity of light passed by the filter, to form an atmospheric trace gas sensor. Such a trace gas sensor may be used in connection with the remote detection of atmospheric trace gas concentrations, and may be deployed as part of a land, air, or space based sensing platform.

DETAILED DESCRIPTION

Figure 1:
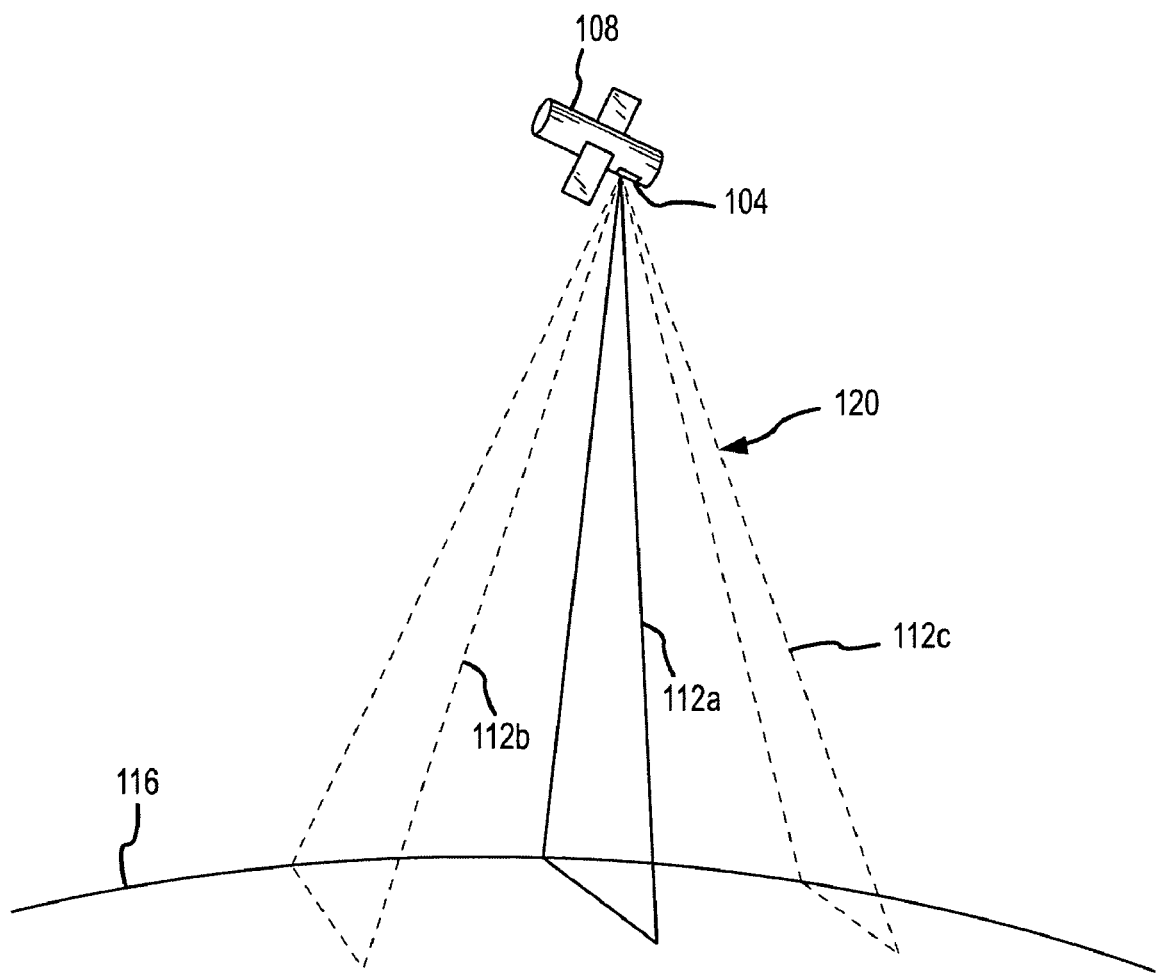
FIG. 1 depicts an arrangement for sensing atmospheric trace gases in accordance with an embodiment of the present invention.

FIG. 1 depicts an arrangement for sensing atmospheric trace gases in accordance with an embodiment of the present invention. In general, the arrangement includes an atmospheric trace gas sensor system 104 in accordance with an embodiment of the present invention, mounted to a platform 108. In general, the platform 108 positions the atmospheric trace gas sensor system 104 such that light may be gathered from a desired portion of the atmosphere. Accordingly, the platform 108 associated with the sensor system 104 may comprise a satellite, such as a geostationary or low-Earth orbiting satellite, as depicted in FIG. 1. In addition, the platform 108 may comprise an aircraft. In accordance with a platform 108 implemented as a satellite or aircraft, the sensor system 104 is typically positioned such that samples of light (shown as segments 112a–c in FIG. 1) are taken by looking down towards the surface of the Earth 116 as the platform 108 moves with respect to the Earth 116 and/or as the sensor system is scanned. In accordance with other embodiments of the present invention, the platform 108 may be positioned on or near the surface of the Earth 116, in which case the sensor system 104 may be oriented such that light is gathered from above or adjacent to the sensor system 104. The span or range of angles over which light can be obtained in connection with sensing a trace gas concentration at an instant in time defines the field of view 120 of the sensor system 104. As will be described in greater detail herein, the sensor system 104 filters collected light, so that the intensity of light at wavelengths corresponding to a number of spectral lines of absorption of an atmospheric trace gas of interest can be measured. The measured intensity of the light can then be used as an indication of the quantity of the atmospheric gas of interest within the atmosphere.

Figure 2:
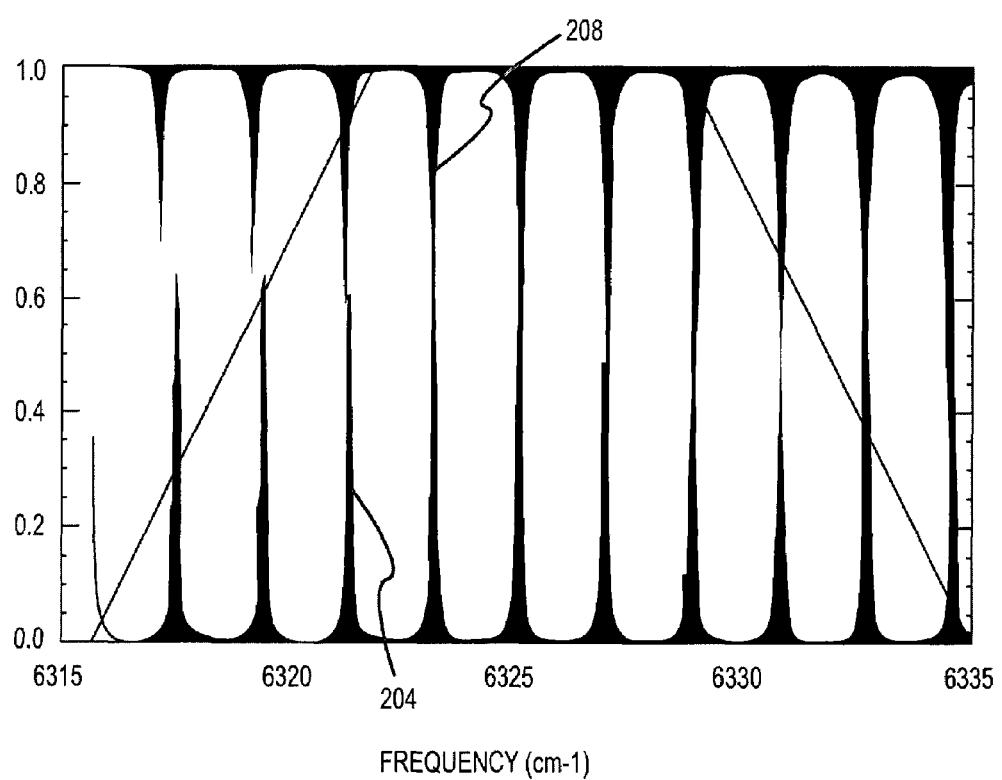
FIG. 2 illustrates the relationship between the spectral lines of absorption of an atmospheric gas and the passbands of a prior art filter.

With reference now to FIG. 2, passbands 204 of a prior art Fabry-Perot interferometer type filter are depicted. The passbands 204 of the prior art filter are periodically spaced. Also depicted in FIG. 2 are ten absorption lines associated with Carbon Dioxide, which is an example of an atmospheric trace gas. As seen in FIG. 2, the absorption lines 208 are not precisely aligned with the passbands 204 of the prior art Fabry-Perot filter. Instead, although several of the passbands 204 may be sufficiently correlated with corresponding absorption lines 208 to provide a signal indicating the presence of Carbon Dioxide ($CO_2$) in the portion of the atmosphere from which the filtered light was obtained, the other absorption lines are not aligned with the passbands 204 of the prior art filter. This is because the spacing between the absorption lines 204 of the $CO_2$, or any other linear molecule, are not strictly uniform. Instead, they exhibit higher order variation and spacing due to the centrifugal stretching of the molecule for larger values of inertia (i.e., for larger J values). Therefore, if more than two or three lines of absorption 204 are observed using a prior art filter, the free spectral range of that filter must be chosen to match the average line spacing. Accordingly, the ability to obtain vertical profiles of gas concentration is lost, as very precise spectral correlation and high spectral resolution are required for such measurements. Alternatively, only two or three lines of absorption 208 may be measured, for example by applying a bandpass filter, resulting in a lower signal level.

Figure 3:
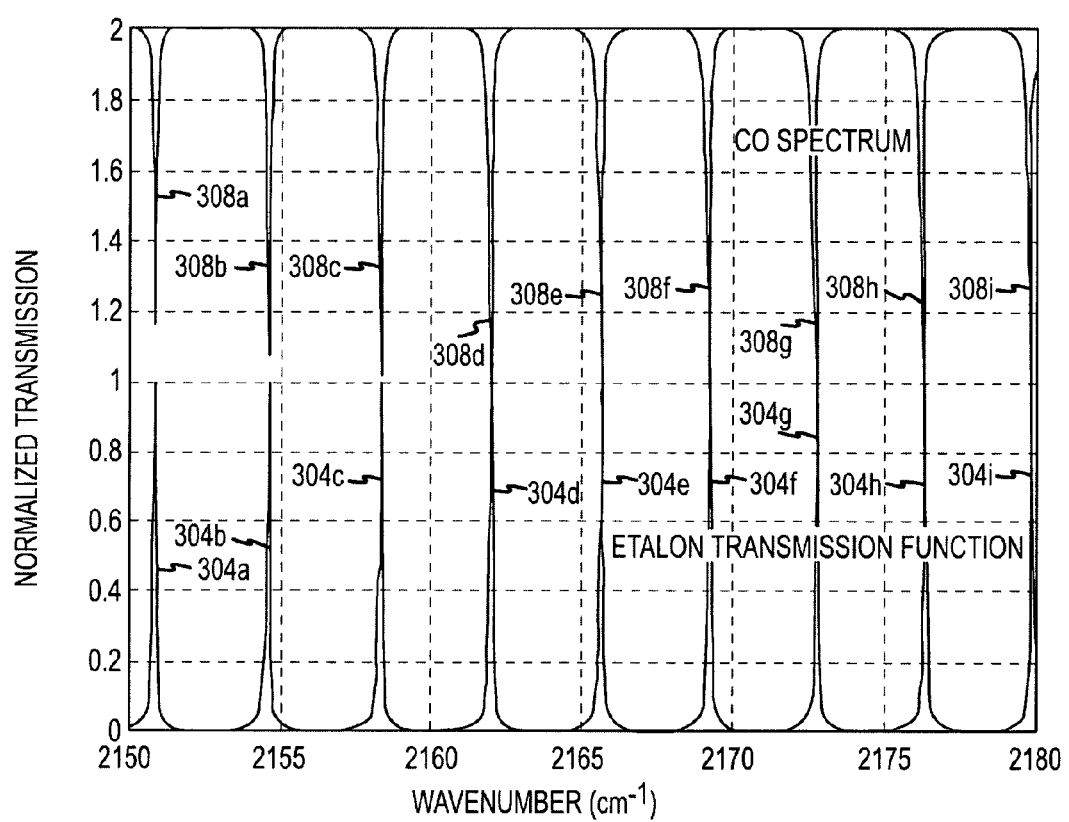
FIG. 3 illustrates the relationship between the spectral lines of absorption associated with an atmospheric gas and the passbands of a correlation filter in accordance with an embodiment of the present invention.

With reference now to FIG. 3, nine passbands 304a–i of a correlation filter in accordance with an embodiment of the present invention are illustrated in relation to nine lines of absorption 308a–i associated with Carbon Monoxide gas. As illustrated by FIG. 3, the passbands 304 of the correlation filter in accordance with this embodiment of the present invention are very closely aligned with the lines of absorption 308 of the trace gas. Therefore, a system 104 in accordance with an embodiment of the present invention is capable of using measurements taken from a relatively large number (for example 9) lines of absorption 308 of a trace gas when determining the amount of that trace gas in the atmosphere. Accordingly, the present invention provides a very favorable signal-to-noise ratio. In addition, because the passbands 304 can be very closely aligned to the lines of absorption 308 of a target gas, the passbands 308 can be quite narrow, allowing very high spectral resolution to be maintained even while gaining the benefit of a high signal-to-noise ratio provided by simultaneously monitoring a large number of absorption lines.

Figure 4:
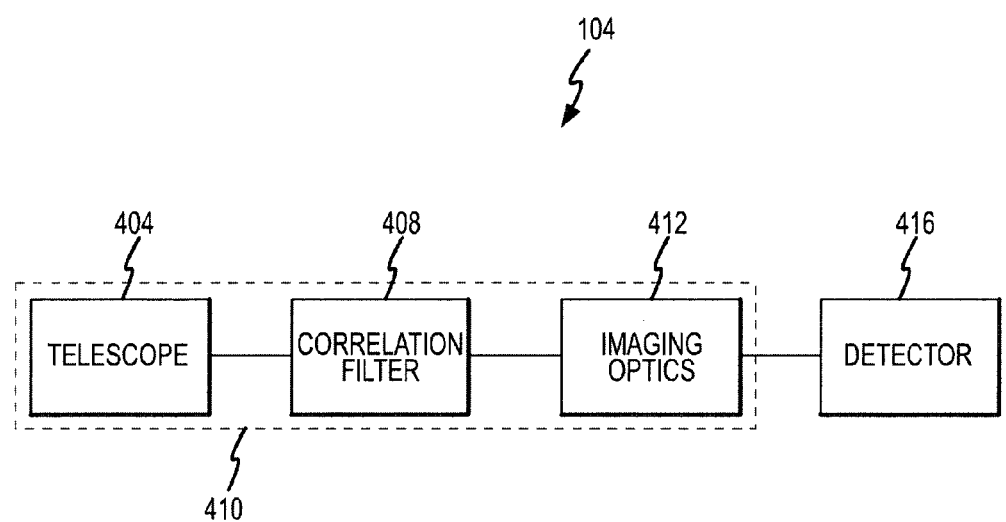
FIG. 4 is a block diagram depicting components of an atmospheric trace gas detection system in accordance with an embodiment of the present invention.

With reference now to FIG. 4, a block diagram depicting a sensor system 104 in accordance with an embodiment of the present invention is shown. In general, the sensor system 104 includes a telescope 404, a correlation filter 408, and an imaging lens group 412, provided as part of an optical system 410, and a detector 416.

The telescope 404 may generally comprise an optical system for gathering light over a selected field of view 120. Futhermore, the telescope 404 may function to provide collimated light or nearly collimated light to the correlation filter 408.

The correlation filter 408 filters the light received from the telescope 404. In general, the correlation filter 408 may comprise an interference filter. In particular, and as will be described in greater detail herein, the correlation filter 408 features a number of non-periodically spaced passbands that are very closely matched to the lines of absorption of an atmospheric gas of interest. Accordingly, light passed by the correlation filter 408 is at wavelengths that substantially correspond to the absorption lines of the atmospheric gas of interest.

Filtered light from the correlation filter 408 is provided to the detector 416 by the imaging optics 412. In general the detector 416 can determine the intensity of the light passed by the correlation filter 408. Accordingly, the detector 416 is capable of simultaneously monitoring the amount of light received by the sensor system 104 at wavelengths corresponding to a number of lines of absorption of a trace gas being measured. As can be appreciated by one of skill in the art, the detector 416 may comprise a photo transducer. The detector 416 may also comprise a processor capable of outputting an indication of a concentration of an atmospheric trace gas within a column of the atmosphere or at a point in the atmosphere from the determined intensity of the filtered light.

Figure 5:
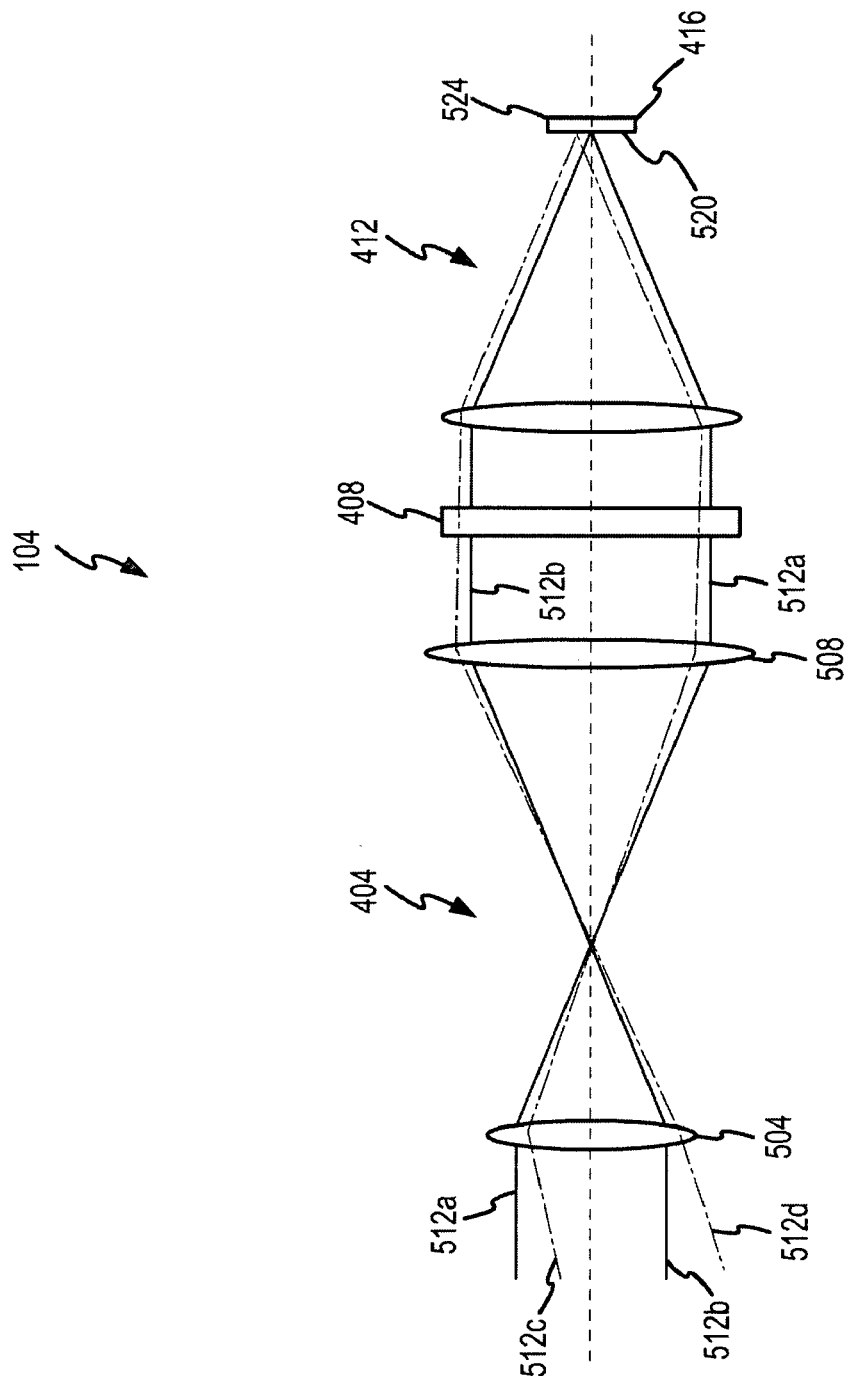
FIG. 5 is a schematic depiction of components of a system for detecting atmospheric trace gases in accordance with an embodiment of the present invention.

With reference now to FIG. 5, components of a sensor system 104 in accordance with an embodiment of the present invention are depicted schematically. In particular, the telescope 404 is illustrated as including an objective lens 504 for collecting light from a volume that comprises the field of view 120 of the sensor system 104. In addition, the telescope 404 is shown as including a rear imaging element or lens 508. Rays 512 illustrating some possible paths of light through the sensor system 104 are also shown. As can be appreciated from the depiction of the lenses 504, 508 of the telescope 404, and from the rays 512 shown passing through the sensor system 104, the telescope 404 comprises refracting elements that deliver collimated or nearly collimated light to the correlation filter 408. As used herein, nearly collimated light means light that is at least within several degrees of being perfectly collimated. Although FIG. 5 depicts the telescope 404 as a refraction type device, other telescope designs can be used. For example, an all reflector design or a combination reflector and refractor (catadioptic) design may be used.

The correlation filter 408 receives the collimated or nearly collimated light provided by the telescope 404, and filters that light. The correlation filter 408 outputs collimated light or nearly collimated light having wavelengths within the passbands of the correlation filter 408. The operation of the correlation filter 408 will be described in greater detail elsewhere herein.

The detector 416 receives the filtered light from the correlation filter 408 and the imaging optics 412. As depicted in FIG. 5, the imaging optics 412 may function to divert or focus the light received from the correlation filter 408 on to the surface 520 of a detector element 524. As can be appreciated by one of skill in the art, the detector element 524 may comprise a photo transducer. For example, the detector element 524 may comprise a charge coupled device (CCD). Because the light received at the detector element 524 has been filtered so that only wavelengths corresponding to absorption lines of a gas being measured (i.e., the target gas) are received, the intensity of the light at the detector element 524 provides an indication of the amount of that gas within the field of view of the sensor system 104. Furthermore, it should be appreciated that the detector 524 simultaneously receives, and simultaneously detects, all of the wavelengths passed by the correlation filter 408. Therefore, a signal having a relatively high signal-to-noise ratio is obtained. As can be appreciated by one of skill in the art, this signal may be provided to a processor that is separate from the detector 416, and from that signal the processor may determine, for example by performing calculations and/or retrieving information from a database, a concentration or amount of the target gas.

Figure 6:
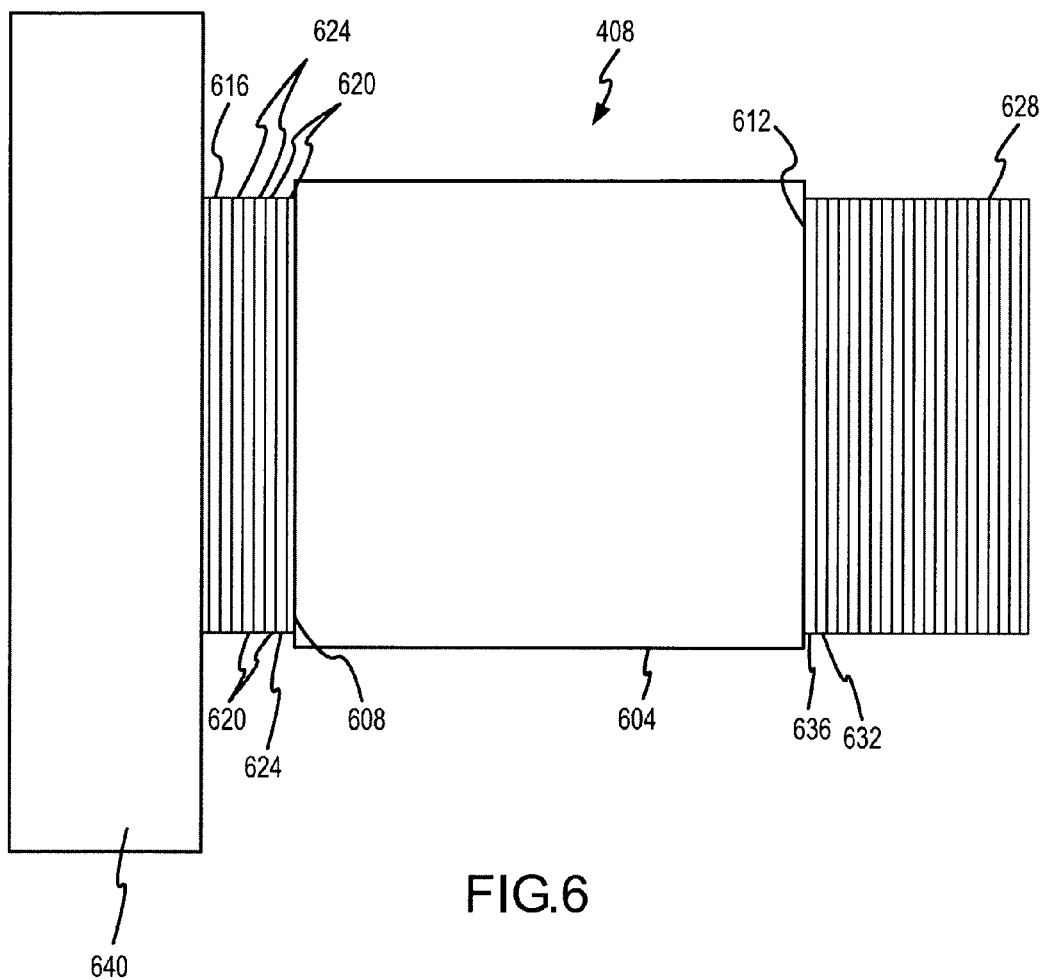
FIG. 6 depicts a correlation filter in accordance with an embodiment of the present invention.

With reference now to FIG. 6, a correlation filter 408 in accordance with an embodiment of the present invention is schematically depicted. As shown in FIG. 6, such an embodiment includes an optical cavity or etalon 604 formed between a mirror at each of the first 608 and second 612 surfaces of the etalon 604. As can be appreciated by one of skill in the art, the etalon 604 may comprise a Fabry-Perot interferometer or etalon. The etalon 604 has an optical thickness corresponding to a number (e.g., 10 or more) of wavelengths of light having a wavelength corresponding to a passband of the correlation filter 408. In accordance with an embodiment of the present invention, the etalon 604 comprises a Silicon or Germanium etalon. For example, in connection with a correlation filter 408 for use in sensing the presence of CO in the atmosphere, the etalon 604 may be formed from a 386.5 μm thick piece of Silicon. In accordance with a further embodiment of the present invention, the etalon 604 may be formed from a piece of material having a diameter of greater than about 5 centimeters. In accordance with still another embodiment of the present invention, the etalon 604 may have a diameter of greater than 8 centimeters. The high refractive index of silicon (for which n=3.42) reduces the sensitivity of the correlation filter 408 to field angle, thereby producing a larger useful field of view than an etalon 604 in which the light passes through a low refractive index cavity, such as a vacuum or air. Although an etalon 604 having a relatively high index of refraction provides certain advantages, it should be appreciated that embodiments of the present invention may include an etalon having a low index of refraction, such as air. In addition, the relatively large diameter assists in providing a relatively large effective field of view.

The first reflective surface 608 of the etalon 604 may be formed on or defined by a multi-layer reflective coating stack 616. The multi-layer reflective coating stack 616 may be formed from alternating layers of high and low index of refraction material. In particular, the reflective stack 616 may be formed from the alternate layering of films having a low index of refraction 620 with films having a high index of refraction 624. In accordance with an embodiment of the present invention, the films or layers of low refractive index material 620 are formed from Silicon Monoxide (SiO) and the high index of refraction layers 624 are formed from Germanium (Ge). In accordance with another embodiment of the present invention, high index of refraction layers 624 formed from Ge are combined with low index of refraction layers 620 formed from Silicon Dioxide ($SiO_2$). Different numbers of thin film layers may be applied to form the reflective stack 616. For example, a three layer stack 616 following the coating formula HLH (where H indicates a high index of refraction layer 624, and where L indicates a low index of refraction material 620) may be used. In accordance with another embodiment of the present invention, a greater number of layers may be applied. For example, the reflective stack 616 may comprise a coating formula described as $(HLH)^3$. Each of the layers 620, 624 of the reflective stack 616 may be formed by depositing successive layers of the material on the first surface 608 of a silicon etalon 604.

A correlation stack 628 comprising alternating layers of high refractive index 632 and low refractive index 636 thin film layers may define or be formed on the second surface 612 of the etalon 604. In connection with the correlation stack 628, at least some of the layers of high 632 and low 636 refractive index material have non-quarter wave optical thicknesses. That is, the thickness of at least some of the layers 632, 636 is not equal to one quarter of a wavelength of light corresponding to the center of a passband of the correlation filter 608 when traveling through such a layer 632, 636. This feature of the correlation stack 628 allows the spacing of the filter transmission peaks to be altered from peaks having perfectly regular spacing to peaks that correspond to the non-periodically spaced absorption lines of an atmospheric gas. More particularly, the thickness of individual layers 632, 636 is chosen to produce a wavelength dependent change in optical path (i.e., phase) and hence a desired change in spacing of the filter transmission peaks.

The correlation stack 628 may include films or layers of Ge to form high index of refraction layers 632 and films or layers of SiO to form low index of refraction layers 636. In accordance with another embodiment of the present invention, the low index of refraction layers 636 may be formed from $SiO_2$ instead of SiO. In general, the exact number of layers 632, 636 and the thicknesses of each of those layers 632, 636 will vary depending on the atmospheric gas whose absorption lines are to be matched by the correlation filter 408. Layers may be added and/or layer thicknesses altered in an iterative process to arrive at the desired passband spacing. As can be appreciated by one of skill in the art, various analytical tools for analyzing and designing optical devices using thin films may be applied in designing the correlation filter 408. In an exemplary embodiment, the correlation stack 628 is formed from about 20 to 30 layers, and has a total stack thickness of 1 to 3 μm. For example, an embodiment of a correlation filter 408 may have a correlation stack 628 with a coating or layer formula of $(HLH)^9$.

As illustrated in FIG. 6, the correlation filter 408 may be formed on or interconnected to a substrate 640. For example, a substrate 640 formed from ZnSe or from Si may be used to facilitate the manufacture and mechanical integrity of the correlation filter 408.

Figure 7:
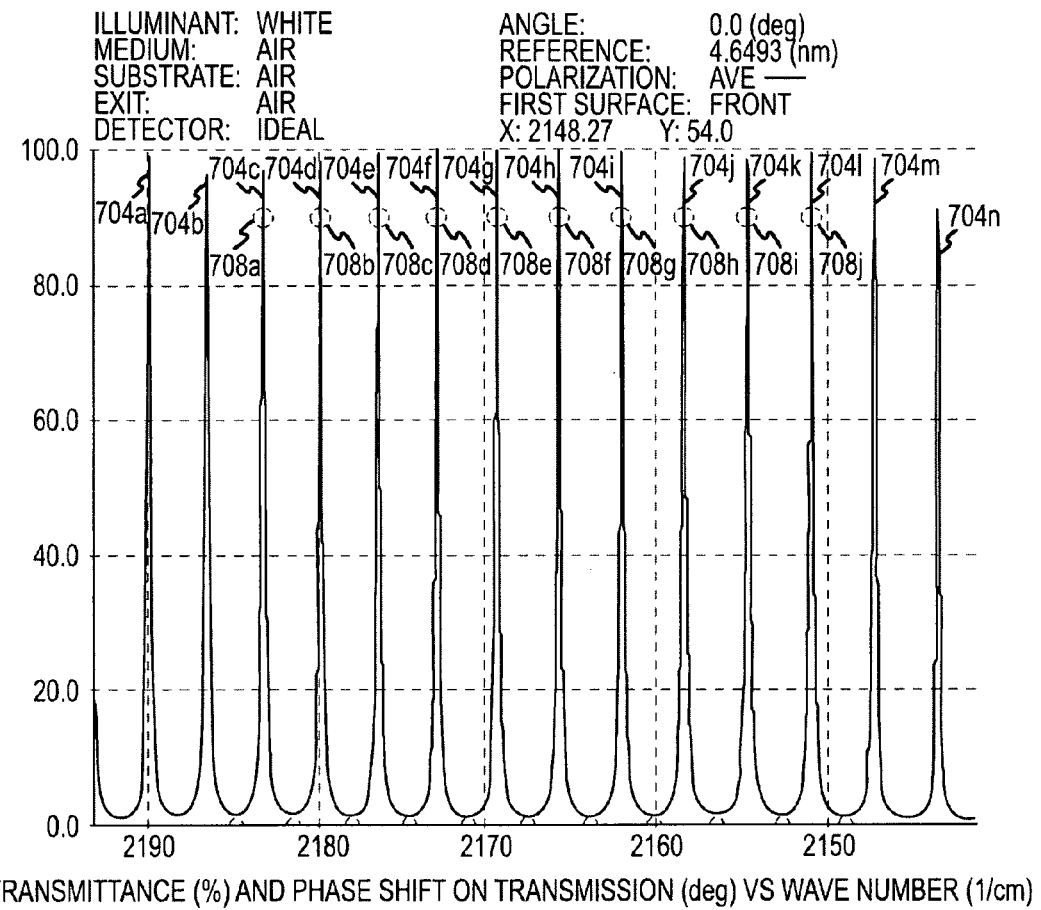
FIG. 7 illustrates the relationship between the passbands of the correlation filter illustrated in FIG. 6 and the spectral lines of absorption of an atmospheric trace gas.

With reference now to FIG. 7, the predicted performance of a correlation filter 408 according to the embodiment of a correlation filter 408 illustrated in connection with FIG. 6 is shown. In FIG. 7, a number of transmission peaks 704*a–n* can be seen. As can be appreciated from a close inspection of the position of the transmission peaks 704, the spacing between adjacent transmission peaks 704 increases with decreasing wave number (i.e., increasing wavelength). In particular, the filter transmission peaks 704 are spaced such that a relatively large number of the transmission peaks (i.e., transmission peaks 704*c–l*) correspond to the infrared absorption line positions of CO, denoted by circles 708*a–j*. Accordingly, it can be appreciated that a correlation filter 408 according to the embodiment illustrated in FIG. 6 can be designed to pass light at wavelengths corresponding to 10 absorption lines associated with CO. Because such a large number of absorption lines 708 are centered within the filter transmission peaks 704, a sensor system 104 utilizing a correlation filter 408 in accordance with the present invention can provide a very high signal-to-noise ratio. In addition, because, as shown in FIG. 7, the transmission peaks 704 are very narrow, a system 104 with very high resolution can be provided. As can be appreciated by one of skill in the art, this correlation filter 408 may be combined with or incorporate a bandpass filter to isolate the ten transmission peaks 704 corresponding to absorption lines 708. As can be appreciated by one of skill in the art, the wavelength of transmission peaks can be selected to correlate to any atmospheric gas.

Figure 8:
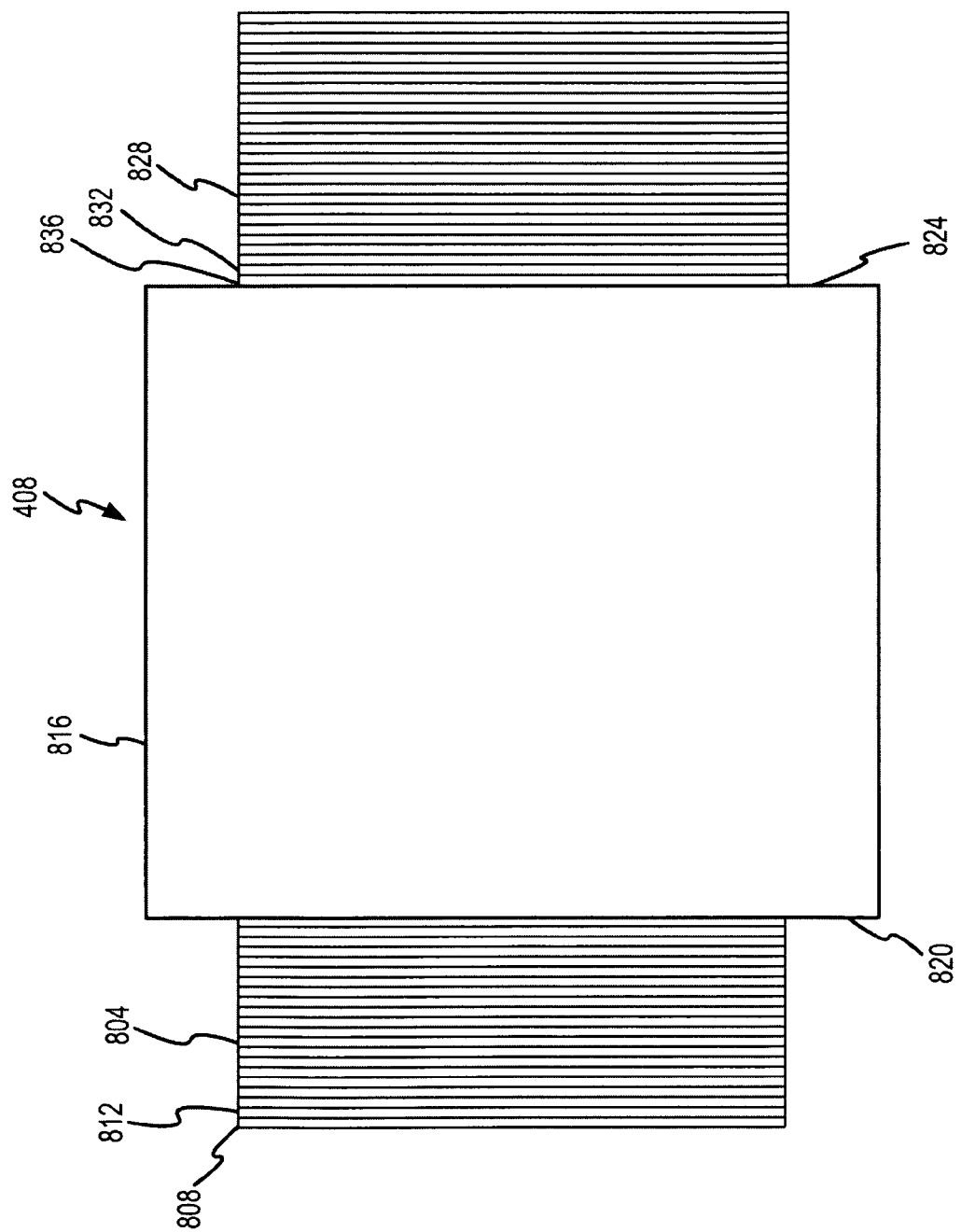
FIG. 8 depicts a correlation filter in accordance with another embodiment of the present invention.

With reference now to FIG. 8, a correlation filter 408 in accordance with another embodiment of the present invention is depicted. According to the embodiment of a correlation filter 408 shown in FIG. 8, the correlation filter 408 includes a multiple layer compensation stack 804 having layers of high index of refraction material 808 alternating with layers of low index of refraction material 812. In particular, at least some of the high index of refraction layers 808 may comprise high index of refraction cavities, formed from a material such as Ge. The low index of refraction layers 812 may comprise low index of refraction spacers formed from $SiO_2$. At least some of the layers 808, 812 have an optical thickness that does not equal an integer multiple of one quarter of the center wavelength of a passband of the correlation filter 408. By providing non-quarter wave thickness layers 808, 812, the phase compensation stack 804 may provide filter characteristics such that the transmission peaks of the correlation filter 408 are non-periodic. In accordance with an embodiment of the present invention, the phase compensation stack 804 may include a total of 21 thin film layers.

The correlation filter 408 may additionally include a substrate 816. In general, the substrate 816 may provide a surface on which the compensation stack 804 may be formed. In addition, the substrate 816 may provide for the mechanical stability of the correlation filter 408. In accordance with an embodiment of the present invention, the substrate 816 may be formed from Germanium and may have a thickness of about 4 millimeters. In accordance with a further embodiment of the present invention, the substrate 816 may include first 820 and second 824 surfaces lying in planes that are not parallel to one another (i.e., the substrate 816 may be wedged). A wedged substrate 816 prevents the substrate 816 from itself forming an optical cavity and thus an interference type filter.

As also shown in FIG. 8, a correlation filter 408 may include a bandpass filter 828 to isolate the transmission peaks of interest. The bandpass filter 828 may be conventionally formed from alternating layers of high 832 and low 836 refractive index layers having quarter wave thicknesses. For example, the bandpass filter 828 may be formed from alternating layers of Titanium dioxide ($TiO_2$) and Silicon dioxide ($SiO_2$).

Figure 9:
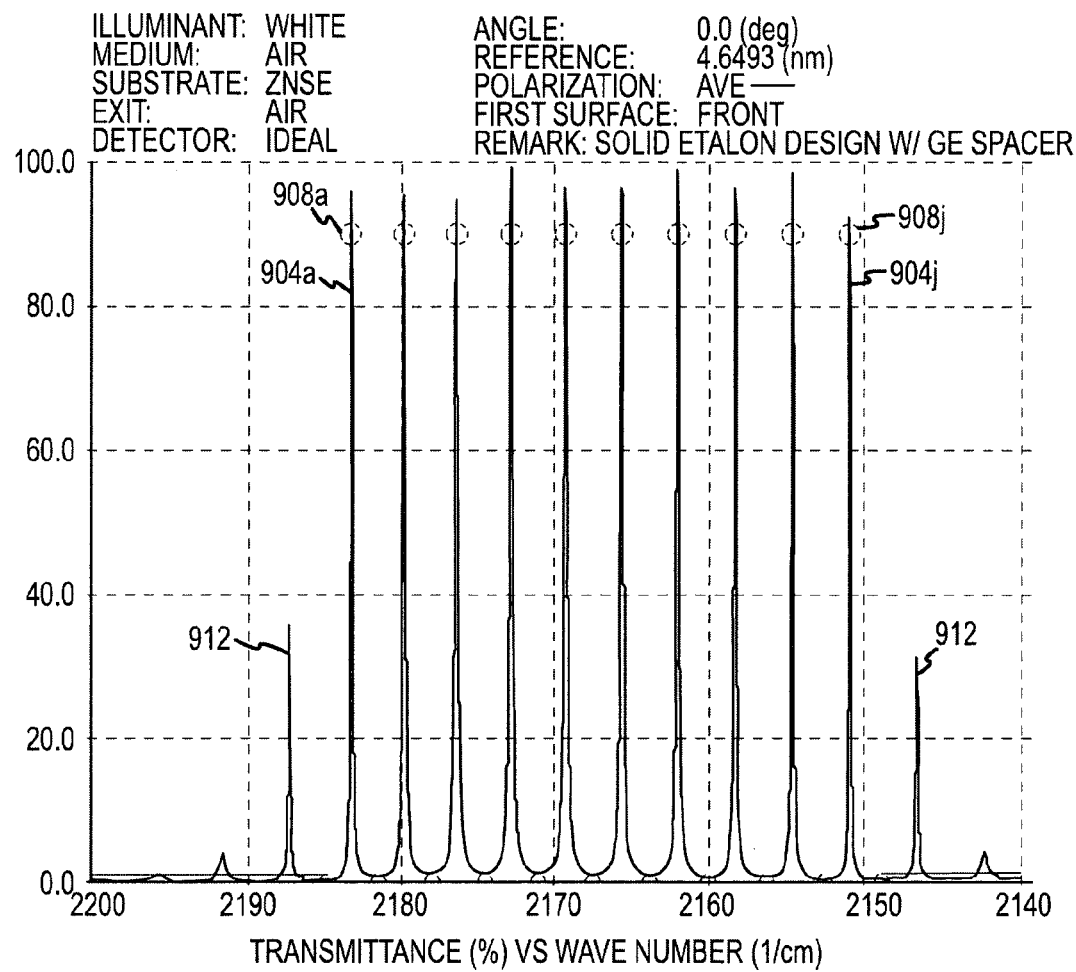
FIG. 9 illustrates the relationships between the passbands of the correlation filter illustrated in FIG. 8 and the spectral lines of absorption of an atmospheric trace gas.

With reference now to FIG. 9, the transmission characteristics of a correlation filter 408 as illustrated in FIG. 8 is shown. In particular, the ten major transmission peaks 904*a–j* corresponding to ten absorption lines of carbon monoxide, indicated by circles 908*a–908j*, are illustrated. Also shown in FIG. 9 are attenuated transmission peaks 912. Such attenuation results from the use of a bandpass filter 828 to isolate the transmission peaks 904 of interest. As seen in FIG. 9, the transmission peaks of the correlation filter 408 occur at 2190.12 $cm^{-1}$, 2186.64 $cm^{-1}$, 2183.22 $cm^{-1}$, 2179.77 $cm^{-1}$, 2176.28 $cm^{-1}$, 2172.76 $cm^{-1}$, 2169.20 $cm^{-1}$, 2165.60 $cm^{-1}$, 2161.97 $cm^{-1}$, 2158.30 $cm^{-1}$, 2154.60 $cm^{-1}$, and 2150.86 $cm^{-1}$, corresponding to the absorption lines of carbon monoxide. In addition, it can be appreciated that the transmission peaks 904 are very narrow. Accordingly, the correlation filter 408 in accordance with an embodiment of the present invention using a multiple cavity correlation stack 804 can provide a high resolution filter response as well as a high signal-to-noise ratio. As can be appreciated by one of skill in the art, the wavelengths at which the transmission peaks (passbands) 904 are centered may be selected to correlate to any atmospheric gas.

The following examples are provided for purposes of illustration only and are not intended to limit the scope of the invention.

EXAMPLE 1

This example correlation filter 408 utilizes a single etalon. In particular, the design utilizes a solid silicon etalon 1004 that is 386.55 um thick with a total of 39 layers of Ge and SiO, with 9 layers 1008 deposited on the front side and 30 layers 1012 deposited on the back side of the etalon 1004 as shown conceptually in FIG. 10. Silicon provides a high refractive index, good thermal properties and good optical quality pieces are widely available. Preliminary prototype etalon fabrication studies show that silicon etalons can be made to precise thickness (+/−0.3 um of target thickness). As can be appreciated by one skilled in the art, minor corrections of thickness errors can be made through temperature tuning to effect a change in the optical path length. In addition, surface roughness of 2.5 nm and local parallelism of <0.5 micro radians can be routinely achieved. Measurements show etalon flatness to be ~3λ, but this may have been influenced in the prototype by how the piece was mounted during test. The unconventional multilayer coating provides sufficient phase dispersion with wavenumber to improve the match between transmission peaks and CO line centers when compared to a traditional etalon design with metallic or quarter wave reflector layers. To improve on the mechanical and thermal integrity of the filter, the filter can be optically contacted to a thick monolithic piece of silicon 1016. The substrate 1016 can be wedged and have an anti-reflective coating 1020 applied on the exit face to minimize its interaction with the filter, reducing or eliminating undesirable channel spectra. The 30 layer coating between the Si etalon and substrate is designed to provide good matching to the substrate refractive index, in addition to wavenumber-dependent phase dispersion to tune the transmission peak locations. Preliminary design analysis shows that 12 transmission peaks match the positions of CO line centers to within +/−0.04 cm$^{-1}$ with a transmission value >95% from the etalon into the silicon substrate. The layer materials Ge (n=4.1) and SiO (n=2.89) are compatible with deposition on silicon and have the added advantage that their individual coating-induced mechanical stresses tend to compensate each other over many layers.

The phase-compensation coating design allows a convenient means to improve peak transmission of an optically-contacted etalon compared to a free-standing etalon through optimization of the matching layer (between the coating stack and the Si substrate) and at the same time optimize for narrow passbands. It is possible to reduce the number of layers by matching fewer CO lines if total layer thickness becomes a fabrication issue. Preliminary analysis shows this design to be reasonably robust to layer thickness errors on the order of 1%. The effect of errors is to systematically shift the peaks in unison in wavelength. Positioning of the transmission peak characteristic curve to a more optimal position at shorter wavelengths along the CO line wing can be easily accomplished by tilt-tuning the etalon.

Figure 10:
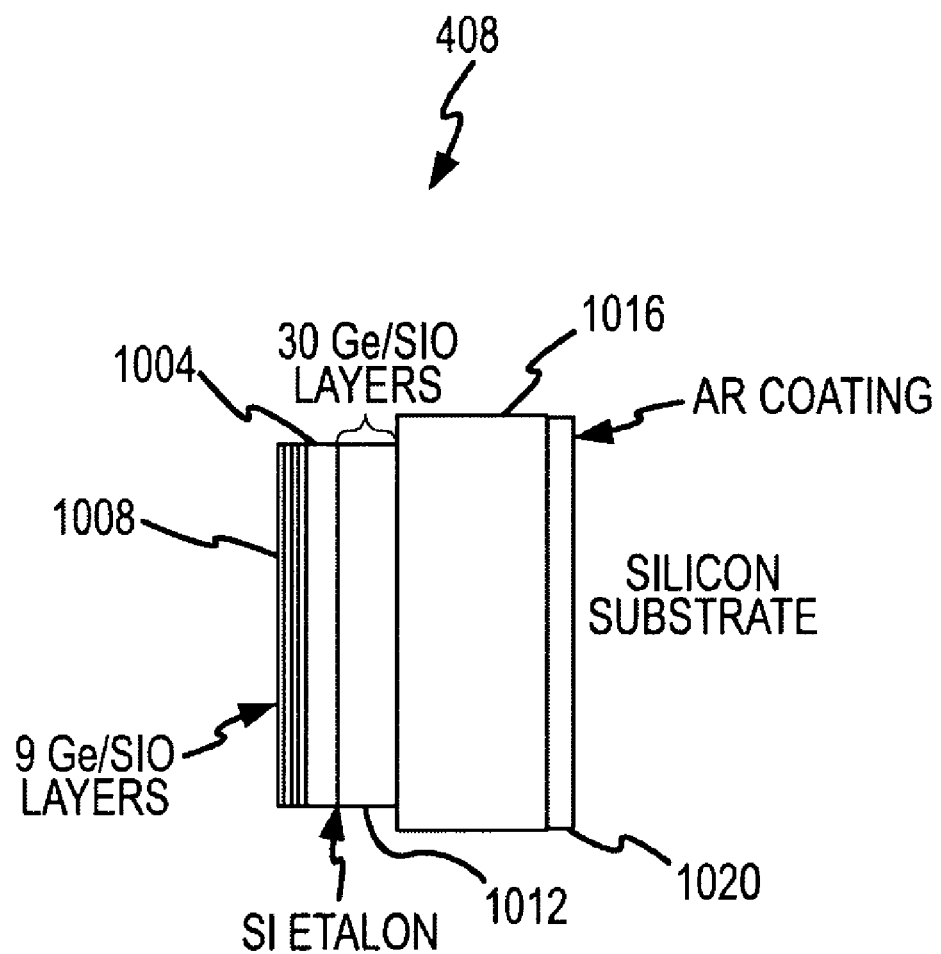
FIG. 10 depicts a correlation filter in accordance with another embodiment of the present invention.
Figure 11:
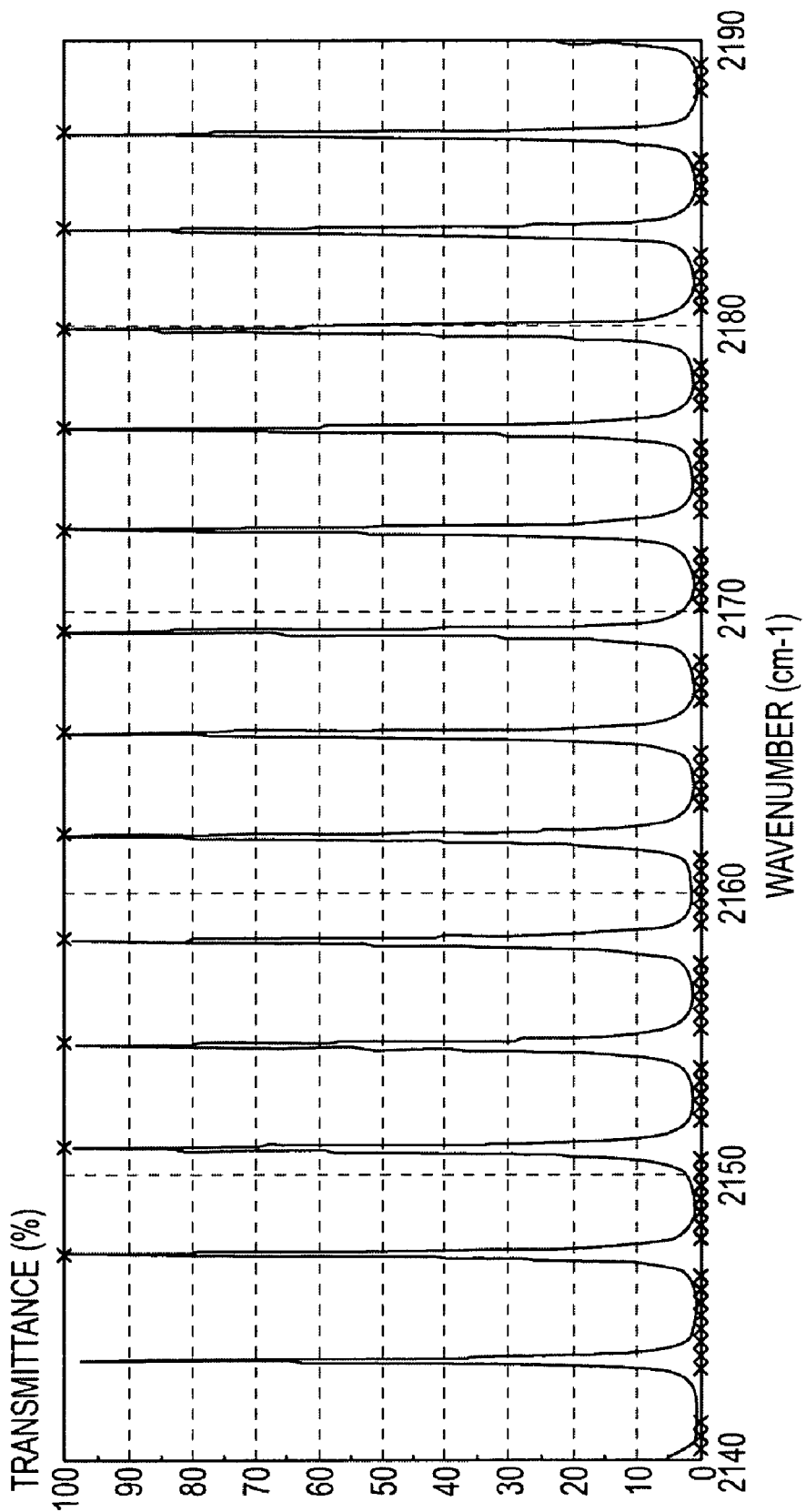
FIG. 11 illustrates transmission peaks of the filter of FIG. 10 over a first range of wave numbers.
Figure 12:
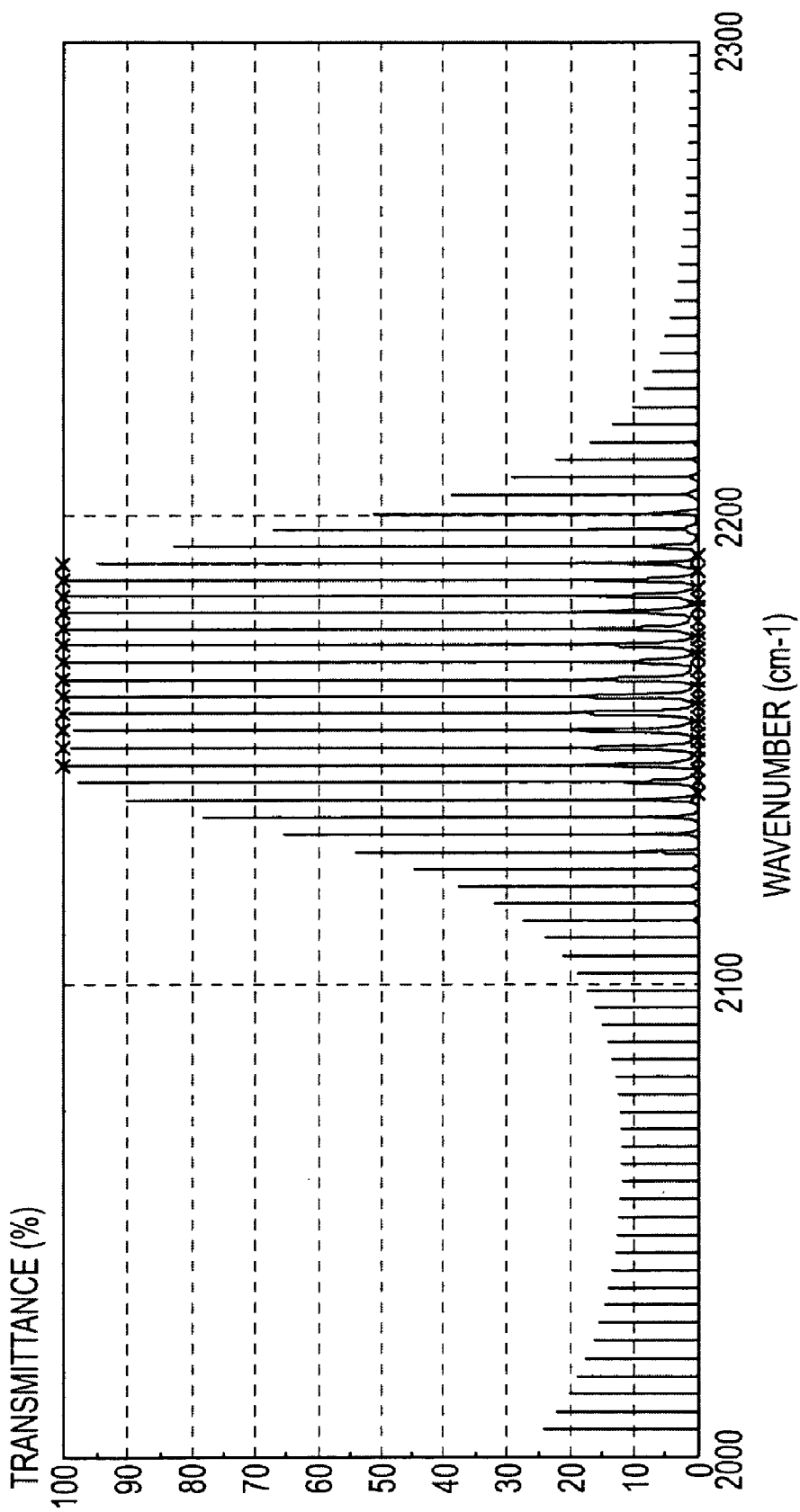
FIG. 12 illustrates transmission peaks of the filter of FIG. 10 over a second range of wave numbers.

Predicted spectral transmission of the silicon etalon correlation filter 408 of FIG. 10 is shown in FIG. 11. The crosses at 100% transmission are the design targets for matching the line centers of the first 12 lines in the R-branch of CO. Targets at zero in the inter-order region are used to optimize filter rejection between spectral lines. FIG. 12 shows the same transmission function as FIG. 11, but over a wider range of wavenumbers. Orders outside of the R-branch lines of interest roll-off to a level of ~20%. A steep-edged 35 cm$^{-1}$ passband blocking filter may be added to reduce these spurious orders to an acceptable level.

Table 1 sets forth the various layers of this first example correlation filter.

TABLE 1

| Design: | | EXAMPLE 1 | |
|---|---|---|---|
| Reference Wavelength (nm): | | 4657.49 | |
| Incident Angle (deg): | | 0 | |
| Layer | Material | Refractive Index | Thickness [nm] |
| Medium | Air | 1 | |
| 1 | Ge | 4.074 | 1133.35 |
| 2 | SiO | 2.2888 | 508.73 |
| 3 | Ge | 4.074 | 264.19 |
| 4 | SiO | 2.2888 | 473.01 |
| 5 | Ge | 4.074 | 332.41 |
| 6 | SiO | 2.2888 | 567.99 |
| 7 | Ge | 4.074 | 350.27 |
| 8 | SiO | 2.2888 | 525.96 |
| 9 | Ge | 4.074 | 250.31 |
| 10 | Si | 3.42736 | 386554.6 |
| 11 | Ge | 4.074 | 331.57 |
| 12 | SiO | 2.2888 | 168.68 |
| 13 | Ge | 4.074 | 373.74 |
| 14 | SiO | 2.2888 | 593.49 |
| 15 | Ge | 4.074 | 867.8 |
| 16 | SiO | 2.2888 | 727.3 |
| 17 | Ge | 4.074 | 1039.14 |
| 18 | SiO | 2.2888 | 478.8 |
| 19 | Ge | 4.074 | 829.93 |
| 20 | SiO | 2.2888 | 1439.86 |
| 21 | Ge | 4.074 | 276.32 |
| 22 | SiO | 2.2888 | 487.47 |
| 23 | Ge | 4.074 | 248.15 |
| 24 | SiO | 2.2888 | 470.27 |
| 25 | Ge | 4.074 | 284.78 |
| 26 | SiO | 2.2888 | 329.39 |
| 27 | Ge | 4.074 | 279.06 |
| 28 | SiO | 2.2888 | 332.4 |
| 29 | Ge | 4.074 | 272.23 |
| 30 | SiO | 2.2888 | 353.92 |
| 31 | Ge | 4.074 | 194.99 |
| 32 | SiO | 2.2888 | 382.67 |
| 33 | Ge | 4.074 | 207.82 |
| 34 | SiO | 2.2888 | 337.6 |
| 35 | Ge | 4.074 | 264.24 |
| 36 | SiO | 2.2888 | 611.9 |
| 37 | Ge | 4.074 | 255.1 |
| 38 | SiO | 2.2888 | 38.68 |
| 39 | Ge | 4.074 | 100.59 |
| 40 | SiO | 2.2888 | 537.83 |
| Substrate | Si | 3.42736 | |

EXAMPLE 2

Figure 13:
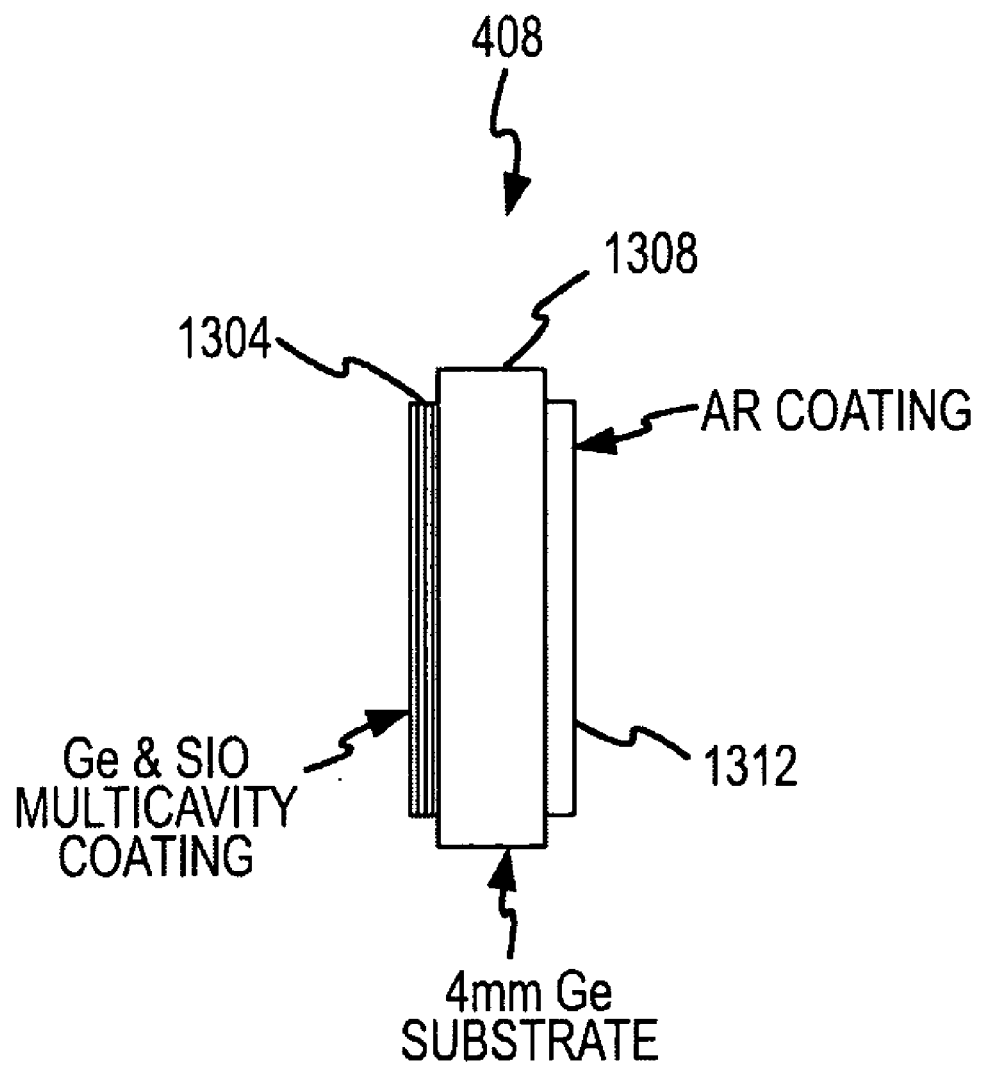
FIG. 13 depicts a correlation filter in accordance with another embodiment of the present invention.

This example correlation filter 408, depicted in FIG. 13, uses a series of asymmetric Ge/SiO spacer and coupling layers 1304 having non-quarterwave thickness. This represents a departure from the periodic design approach of the prior art for producing interference filters with multiple peaks. The change in spectral line spacing of linear molecules CO and $CO_2$ is cubic in nature requiring a higher degree of design freedom than allowed for by a periodic structure. Allowing the design to be asymmetric with non-quarterwave layer thickness provides the needed additional degrees of freedom. The filter stack 1304 can be deposited onto a thick Ge substrate 1308 to make the filter shock and vibration tolerant. Desirable features for the filter include positions of peak transmission that coincide with the CO line centers' peak positions, and minimum transmission between peaks. The design goal was to match 4 to 5 orders within +/−0.05 cm⁻. Reducing the number of target lines matched by the filter from a number greater than 5 improved the resultant layer thickness profiles (from the view of fabrication) and inter-band rejection. In addition relaxing the requirement to match adjacent CO lines also enabled improved the resultant filter spectral characteristic.

This exemplary filter design comprises a 62-layer Ge/SiO stack 1304 on a 4 mm Ge substrate 1308. In addition, an antireflective coating 1312 may be included. Five CO lines are matched with this design to within approximately +/−0.02 cm$^{-1}$ (assuming some small amount of tilt-tuning). Peak transmission is >90% for all passbands. The resulting spectral widths of the transmission passbands are ≦0.4 cm$^{-1}$, because it is believed that further design optimization may achieve a passband width of 0.1 cm$^{-1}$. One of the very desirable aspects of this exemplary design is the strongly contaminated CO line near 2162 cm$^{-1}$ is avoided. In addition, out-of-band rejection beyond the 5-orders of interest eases requirements for a narrow passband blocking filter. Layer tolerances should be within about ~0.1 to 0.2%.

Figure 14:
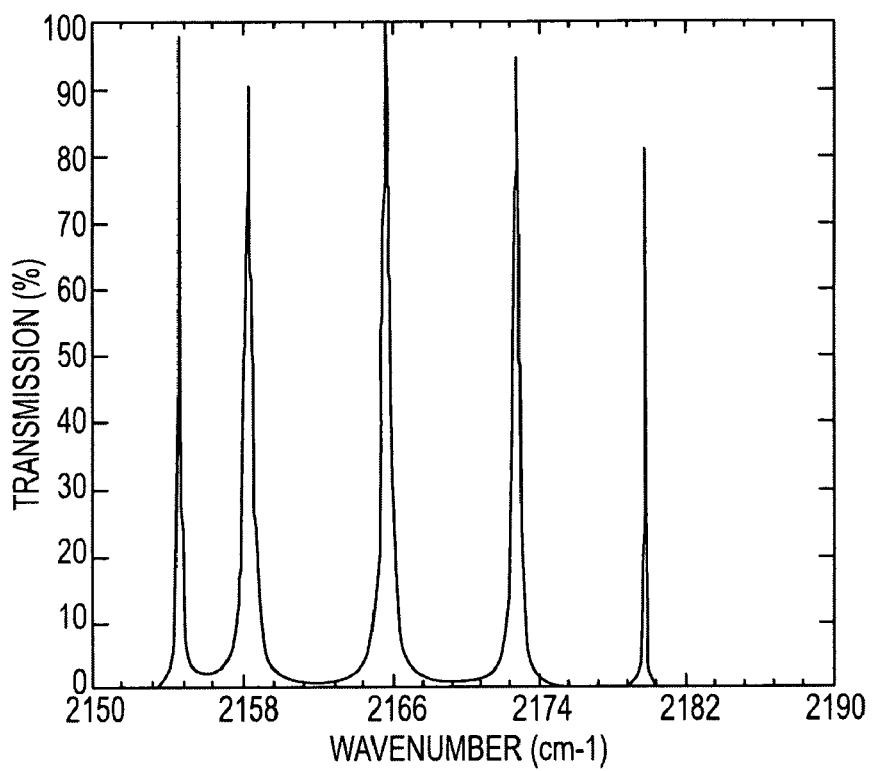
FIG. 14 illustrates transmission peaks of the filter of FIG. 13.
Figure 15:
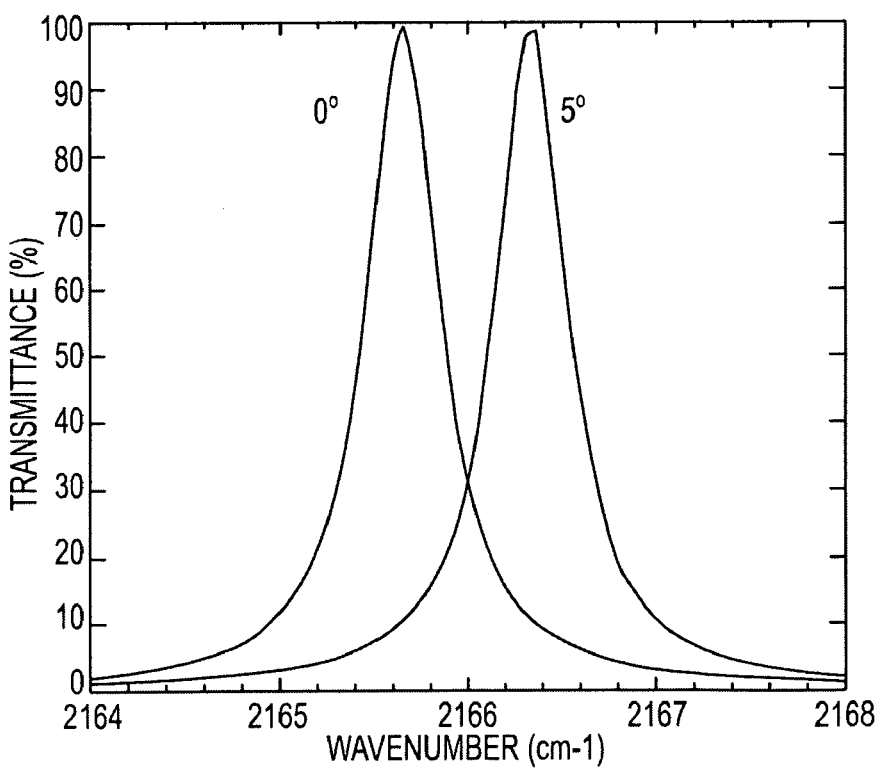
FIG. 15 illustrates the shift in transmission wavelength with angle for the filter of FIG. 13.

Transmission peaks are centered at 2179.77 cm$^{-1}$, 2172.76 cm$^{-1}$, 2165.63 cm$^{-1}$, 2158.28 cm$^{-1}$, and 2154.60 cm$^{-1}$, corresponding to the 2179.7719 cm$^{-1}$, 2172.7588 cm$^{-1}$, 2165.6010 cm$^{-1}$, 2158.2997 cm$^{-1}$, and 2154.5956 cm$^{-1}$ spectral lines of absorption of CO (see FIG. 14). The shift in peak transmission at 5-degrees is 0.7 cm$^{-1}$ (See FIG. 15). Some of the candidate filter designs showed moderate polarization sensitivity at a 5-degree incidence angle. Filter transmission at several incidence angles was calculated and the effective index of refraction of the filter was derived from this dependence:

$$n^* \approx \sqrt{n_H n_L} = 3.34.$$

Figure 16:
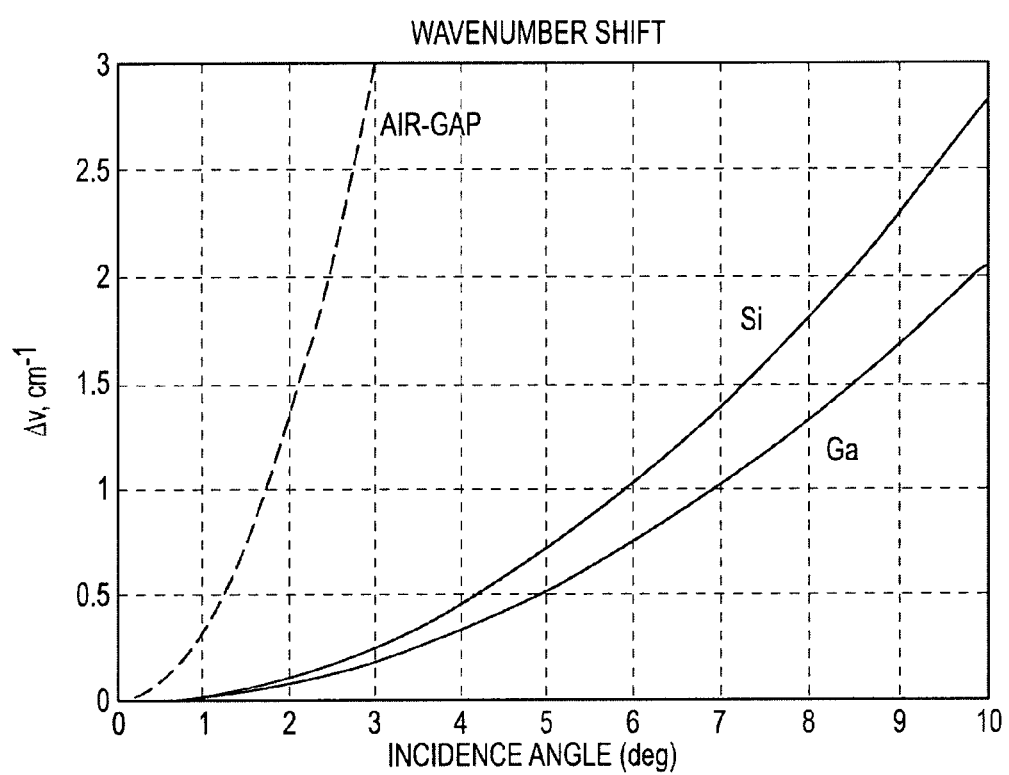
FIG. 16 illustrates the wavelength shift as a function of effective index of refraction for the filter of FIG. 13.
Figure 17:
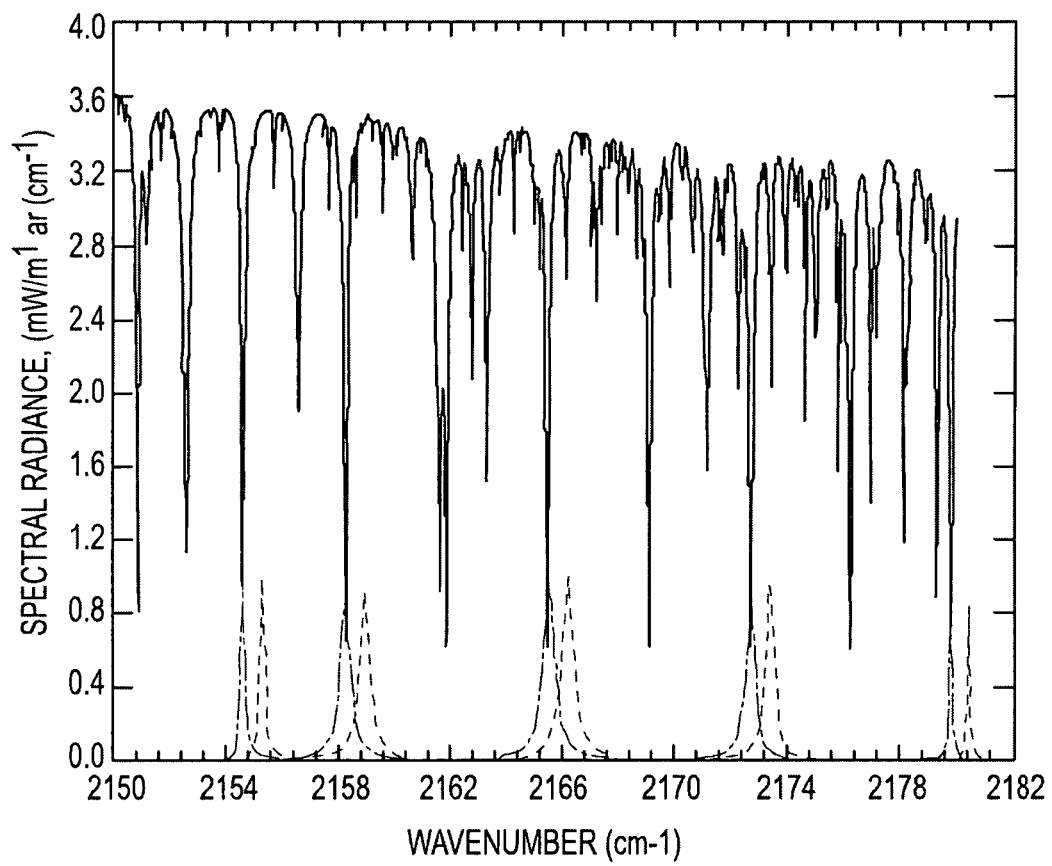
FIG. 17 illustrates the relationship between the filter transmission peaks for the filter of FIG. 13 and absorption lines for CO.

The results are plotted in FIG. 16 using the equation for small angles: $\partial\lambda = \lambda\theta^2/(2n^2)$. The relationship between the transmission peaks at 0° and at 5° angle of incidence for the correlation filter 408 of this second example and the spectral lines of absorption of CO is illustrated in FIG. 17.

Table 2 sets forth the various layers of the second example correlation filter.

TABLE 2

| Design: | targc_do4_02_b_o6 | | |
|---|---|---|---|
| Reference Wavelength (nm): | 4615 | | |
| Incident Angle (deg): | 0 | | |
| | | Refractive | |
| Layer | Material | Index | Thickness [nm] |
| Medium | Air | 1 | |
| 1 | SiO | 2.2888 | 8139.32 |
| 2 | Ge | 4.074 | 397.53 |
| 3 | SiO | 2.2888 | 96.67 |
| 4 | Ge | 4.074 | 416.7 |
| 5 | SiO | 2.2888 | 367.72 |
| 6 | Ge | 4.074 | 4187.11 |

TABLE 2-continued

| Design: | targc_do4_02_b_o6 | | |
|---|---|---|---|
| Reference Wavelength (nm): | 4615 | | |
| Incident Angle (deg): | 0 | | |
| | | Refractive | |
| Layer | Material | Index | Thickness [nm] |
| 7 | SiO | 2.2888 | 6526.32 |
| 8 | Ge | 4.074 | 2996.41 |
| 9 | SiO | 2.2888 | 2423.11 |
| 10 | Ge | 4.074 | 282.29 |
| 11 | SiO | 2.2888 | 515.18 |
| 12 | Ge | 4.074 | 281.65 |
| 13 | SiO | 2.2888 | 504.01 |
| 14 | Ge | 4.074 | 845.39 |
| 15 | SiO | 2.2888 | 503.97 |
| 16 | Ge | 4.074 | 1699.13 |
| 17 | SiO | 2.2888 | 504.17 |
| 18 | Ge | 4.074 | 845.43 |
| 19 | SiO | 2.2888 | 506.72 |
| 20 | Ge | 4.074 | 261.6 |
| 21 | SiO | 2.2888 | 545.7 |
| 22 | Ge | 4.074 | 135.87 |
| 23 | SiO | 2.2888 | 2.36 |
| 24 | Ge | 4.074 | 177.25 |
| 25 | SiO | 2.2888 | 528.07 |
| 26 | Ge | 4.074 | 285.62 |
| 27 | SiO | 2.2888 | 504.64 |
| 28 | Ge | 4.074 | 1700.57 |
| 29 | SiO | 2.2888 | 504.72 |
| 30 | Ge | 4.074 | 283.85 |
| 31 | SiO | 2.2888 | 508.34 |
| 32 | Ge | 4.074 | 284.16 |
| 33 | SiO | 2.2888 | 511.5 |
| 34 | Ge | 4.074 | 273 |
| 35 | SiO | 2.2888 | 480.09 |
| 36 | Ge | 4.074 | 40.23 |
| 37 | SiO | 2.2888 | 680 |
| 38 | Ge | 4.074 | 149.67 |
| 39 | SiO | 2.2888 | 440 |
| 40 | Ge | 4.074 | 809.9 |
| 41 | SiO | 2.2888 | 459.12 |
| 42 | Ge | 4.074 | 266 |
| 43 | SiO | 2.2888 | 453.63 |
| 44 | Ge | 4.074 | 149.45 |
| 45 | SiO | 2.2888 | 1.8 |
| 46 | Ge | 4.074 | 130.81 |
| 47 | SiO | 2.2888 | 504.64 |
| 48 | Ge | 4.074 | 283.62 |
| 49 | SiO | 2.2888 | 504.68 |
| 50 | Ge | 4.074 | 1699.07 |
| 51 | SiO | 2.2888 | 503.78 |
| 52 | Ge | 4.074 | 282.89 |
| 53 | SiO | 2.2888 | 504.41 |
| 54 | Ge | 4.074 | 282.43 |
| 55 | SiO | 2.2888 | 505.77 |
| 56 | Ge | 4.074 | 282.09 |
| 57 | SiO | 2.2888 | 503.73 |
| 58 | Ge | 4.074 | 283.76 |
| 59 | SiO | 2.2888 | 503.68 |
| 60 | Ge | 4.074 | 1699.12 |
| 61 | SiO | 2.2888 | 504.29 |
| 62 | Ge | 4.074 | 283.22 |
| 63 | SiO | 2.2888 | 503.18 |
| 64 | Ge | 4.074 | 283.49 |
| 65 | SiO | 2.2888 | 508.83 |
| 66 | Ge | 4.074 | 287.29 |
| 67 | SiO | 2.2888 | 3552.15 |
| 68 | Ge | 4.074 | 1470.11 |
| 69 | SiO | 2.2888 | 5495 |
| 70 | Ge | 4.074 | 1439.56 |
| 71 | SiO | 2.2888 | 779.63 |
| 72 | Ge | 4.074 | 285.7 |
| 73 | SiO | 2.2888 | 671.76 |
| 74 | Ge | 4.074 | 105.46 |
| 75 | SiO | 2.2888 | 1.65 |
| 76 | Ge | 4.074 | 38.97 |
| 77 | SiO | 2.2888 | 103.05 |
| 78 | Ge | 4.074 | 414.23 |

TABLE 2-continued

Design: targc_do4_02_b_o6
Reference Wavelength (nm): 4615
Incident Angle (deg): 0

| Layer | Material | Refractive Index | Thickness [nm] |
|---|---|---|---|
| 79 | SiO | 2.2888 | 56.91 |
| 80 | Ge | 4.074 | 378.99 |
| 81 | SiO | 2.2888 | 1098.86 |
| 82 | Ge | 4.074 | 172.09 |
| 83 | SiO | 2.2888 | 130.64 |
| 84 | Ge | 4.074 | 168.58 |
| 85 | SiO | 2.2888 | 162.94 |
| 86 | Ge | 4.074 | 186.64 |
| 87 | SiO | 2.2888 | 260.9 |
| 88 | Ge | 4.074 | 174.83 |
| 89 | SiO | 2.2888 | 13.45 |
| 90 | Ge | 4.074 | 90.23 |
| 91 | SiO | 2.2888 | 2.78 |
| 92 | Ge | 4.074 | 11.9 |
| 93 | SiO | 2.2888 | 0.08 |
| 94 | Ge | 4.074 | 83.29 |
| 95 | SiO | 2.2888 | 126.04 |
| 96 | Ge | 4.074 | 82.84 |
| 97 | SiO | 2.2888 | 52.68 |
| Substrate | Ge | 4.074 | |

It should be appreciated that embodiments of the present invention are applicable to infrared and/or visible wavelengths. As can also be appreciated by one of skill in the art, a correlation filter in accordance with the present invention is not limited to the particular layer materials set forth in the examples given above. In general, layer materials may be selected in view of various considerations, including operating wavelengths, desired refractive index, dispersion characteristics, absorption loss, homogeneity, workability, optical quality, and cost. For purposes of providing further examples, but without limiting the present invention, layer materials may also include PbTe, Ge, Si, GeSe, ZnSe, ZnS, CdTe, and SiO. Such exemplary layer materials are particularly useful in connection with infrared applications. Additional examples of layer materials, for use in connection with visible or ultraviolet light, include silica and plain glass materials. Other layer material may also be used in various applications.

As can be appreciated by one of skill in the art, various measures may be taken with respect to the thermal stability of a correlation filter 408 in accordance with embodiments of the present invention. Such measures may include active or passive designs, and are particularly applicable in connection with devices deployed in space. In addition, it should be appreciated that the present invention is not limited to tropospheric gas species. For instance, embodiments of the present invention may also be used in connection with sensing trace gases in the stratosphere.

Although the foregoing discussion has described using a correlation filter 408 having passbands centered on the wavelengths associated with the absorption lines of an atmospheric gas, the present invention is not so limited. For example, spectral lines associated with other elements may be isolated using a correlation filter 408 as described herein. In addition, a correlation filter 408 in accordance with the present invention may be provided having passbands that are shifted to sample a spectral position occurring along the absorption line wing of an atmospheric gas to obtain information about the height distribution of the gas. As a further example, the passbands of a correlation filter 408 in accordance with the present invention may be adjusted to compensate for the different spectral responses caused by receiving light at an angle to the correlation filter 408.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A correlated filter device, comprising:
a compensation stack including a plurality of layers, wherein an optical thickness of at least some of said layers of said compensation stack does not equal an integer multiple of one-quarter of a wavelength of light having a first wavelength corresponding to a first passband of said filter device having a first center wavelength, wherein said filter device further comprises a second passband having a second center wavelength and a third passband having a third center wavelength, wherein said first center wavelength is separated from said second center wavelength by a first amount and wherein said second center wavelength is separated from said third center wavelength by a second amount that is not equal to said first amount.

2. The device of claim 1, wherein said optical thickness of a layer comprises a distance equal to a thickness of said layer multiplied by an index of refraction of said layer.

3. The device of claim 1, wherein said first wavelength is a wavelength of light in a vacuum.

4. The device of claim 1, further comprising: an optical cavity.

5. The device of claim 4, further comprising a reflective stack including a plurality of layers, wherein said compensation stack is associated with a first reflective surface of said optical cavity, and wherein said compensation stack comprises a second reflective surface of said optical cavity.

6. The device of claim 4, wherein said optical cavity has an optical thickness greater than ten of said first wavelengths.

7. The device of claim 4, wherein said optical cavity comprises an etalon.

8. The device of claim 7, wherein said etalon comprises at least one of a Silicon etalon and a Germanium etalon.

9. The device of claim 7, wherein said etalon comprises a Silicon etalon and has a thickness of about 386.5 mm.

10. The device of claim 1, further comprising: a plurality of optical cavities.

11. The device of claim 10, wherein at least some of said optical cavities are formed as layers within said compensation stack.

12. The device of claim 10, wherein said plurality of optical cavities comprise layers within a filter having an optical thickness at least as great as one-half of said first center wavelength.

13. The device of claim 1, wherein said compensation stack comprises high index of refraction layers formed from Germanium and low index of refraction layers formed from Silicon Monoxide.

14. The device of claim 1, further comprising: a bandpass filter.

15. A system for sensing atmospheric trace gases, comprising:
- at least a first optical cavity;
- a first reflective stack forming a first reflective surface of said optical cavity, said first reflective stack including a plurality of thin film layers, wherein at least one of said thin film layers bas an optical thickness that is not equal to one quarter of a wavelength of light at a first passband of said system;
- a second reflective stack forming a second reflective surface of said optical cavity, wherein said first reflective stack comprises a compensation stack, wherein passbands of said system are not regularly spaced, and wherein said second reflective stack comprises a bandpass filter.

16. The system of claim 15, wherein said at least a first optical cavity comprises an etalon having an optical thickness greater than about ten times said wavelength of light at said first passband of said system.

17. The system of claim 16, wherein said etalon comprises at least one of a Silicon and a Germanium etalon.

18. The system of claim 15, wherein said system includes at least six passbands, and wherein each of said six passbands is centered at an absorption line of an atmospheric gas.

19. The system of claim 18, wherein said atmospheric gas comprises one of Carbon Monoxide and Carbon Dioxide.

20. The system of claim 15, wherein said first reflective stack comprises Germanium high index of refraction layers and Silicon Monoxide low index of refraction layers.

21. The system of claim 15, further comprising a detector, wherein light having a wavelength within said first passband, a second passband, and a third passband of said system is received at said detector, and wherein said first, second, and third passbands are separated from one another by different amounts.

22. A system for sensing atmospheric trace gases, comprising:
- a correlation filter including:
- a plurality of thin film layers, wherein said thin film layers include a plurality of high index of refraction layers and a plurality of low index of refraction layers, wherein at least some of said thin film layers have an optical thickness that is not equal to a quarterwave of light having a first wavelength corresponding to a center wavelength of a first passband of said correlation filter; and
- a plurality of optical cavities, wherein said system includes at least six passbands, and wherein each of said six passbands is centered at an absorption line of an atmospheric gas.

23. The system of claim 22, wherein said plurality of optical cavities comprise thin film layers having an optical thickness of at least one-half a wavelength of said first wavelength.

24. The system of claim 22, wherein passbands of said system are not regularly spaced.

25. The system of claim 22, further comprising:
- a substrate, wherein said compensation stack is interconnected to a first surface of said substrate.

26. The system of claim 24, further comprising:
- a bandpass filter stack, including a plurality of high index of refraction thin film layers and a plurality of low index of refraction thin film layers interconnected to a second surface of said substrate.

27. The system of claim 22, wherein said atmospheric gas comprises one of Carbon Monoxide and Carbon Dioxide.

28. The system of claim 22, wherein said high index of refraction layers comprise Germanium and said low index of refraction layers comprise Silicon Monoxide.

29. A system for sensing atmospheric trace gases, comprising:
- a correlation filter including:
- a plurality of thin film layers, wherein said thin film layers include a plurality of high index of refraction layers and a plurality of low index of refraction layers, wherein at least some of said thin film layers have an optical thickness that is not equal to a quarterwave of light having a first wavelength corresponding to a center wavelength of a first passband of said correlation filter; and
- a plurality of optical cavities, further comprising a detector, wherein light having a wavelength within said first passband, a second passband, and a third passband of said system is received at said detector, and wherein said first, second, and third passbands are separated from one another by different amounts.

30. The system of claim 29, wherein said plurality of optical cavities comprise thin film layers having an optical thickness of at least one-half a wavelength of said first wavelength.

31. The system of claim 29, wherein passbands of said system are not regularly spaced.

32. The system of claim 29, further comprising:
- a substrate, wherein said compensation stack is interconnected to a first surface of said substrate.

33. The system of claim 29, further comprising:
- a bandpass filter stack, including a plurality of high index of refraction thin film layers and a plurality of low index of refraction thin film layers interconnected to a second surface of said substrate.

34. The system of claim 29, wherein each of said first, second and third passbands is centered at an absorption line of an atmospheric gas.

35. The system of claim 34, wherein said atmospheric gas comprises one of Carbon Monoxide and Carbon Dioxide.

36. The system of claim 29, wherein said high index of refraction layers comprise Germanium and said low index of refraction layers comprise Silicon Monoxide.

* * * * *